(12) United States Patent
Huber et al.

(10) Patent No.: US 7,422,234 B2
(45) Date of Patent: Sep. 9, 2008

(54) AIR-BAG ASSEMBLY FOR A MOTOR VEHICLE

(75) Inventors: Joachim Huber, Kirchdorf (DE); Ernst Wittmann, Hebertshausen (DE)

(73) Assignee: Autoliv Development AB, Vargarda (SE)

( * ) Notice: Subject to any disclaimer, the term of this patent is extended or adjusted under 35 U.S.C. 154(b) by 49 days.

(21) Appl. No.: 10/556,323

(22) PCT Filed: Apr. 21, 2004

(86) PCT No.: PCT/EP2004/004210

§ 371 (c)(1), (2), (4) Date: Aug. 24, 2006

(87) PCT Pub. No.: WO2004/098957

PCT Pub. Date: Nov. 18, 2004

(65) Prior Publication Data
US 2007/0126220 A1 Jun. 7, 2007

(30) Foreign Application Priority Data
May 10, 2003 (DE) .............................. 103 21 066

(51) Int. Cl.
*B60R 21/21* (2006.01)
*B60R 21/207* (2006.01)
(52) U.S. Cl. ..................... 280/730.2; 280/740
(58) Field of Classification Search .................. 280/729, 280/730.2, 740, 742, 743.1
See application file for complete search history.

(56) References Cited

U.S. PATENT DOCUMENTS

| 4,063,350 | A | * | 12/1977 | Evans .......................... 29/828 |
| 5,470,106 | A | * | 11/1995 | Nishimura et al. ........ 280/743.1 |
| 5,556,128 | A | | 9/1996 | Sinnhuber et al. |
| 6,113,134 | A | | 9/2000 | Lim |
| 6,349,964 | B1 | * | 2/2002 | Acker et al. .............. 280/730.2 |
| 6,976,702 | B2 | * | 12/2005 | Yokota et al. ............. 280/730.2 |
| 7,021,652 | B2 | * | 4/2006 | Kumagai et al. ............. 280/729 |
| 2001/0007391 | A1 | | 7/2001 | Hamada et al. |
| 2004/0021304 | A1 | * | 2/2004 | Tanase et al. ................ 280/729 |

FOREIGN PATENT DOCUMENTS

| DE | 195 29 829 C1 | 10/1996 |
| DE | 102 11 232 A1 | 10/2003 |
| EP | 1 008 494 A2 | 6/2000 |
| EP | 1 122 134 A1 | 8/2001 |
| EP | 1 273 486 A2 | 2/2002 |
| EP | 1 433 667 A2 | 6/2004 |
| JP | 2000-85515 | 3/2000 |
| JP | 2001-114060 | 4/2001 |

\* cited by examiner

*Primary Examiner*—Eric Culbreth
*Assistant Examiner*—Joseph Rocca
(74) *Attorney, Agent, or Firm*—Brinks Hofer Gilson & Lione

(57) ABSTRACT

An airbag for use in motor vehicles having two or more chambers, which is simple to manufacture, low-cost and not susceptible to disturbances. The airbag is configured such that the chambers can have different internal pressures in case of airbag activation since a dividing seam between the chambers of the airbag is configured to act as a gas stream divider and direct differing quantities of gas into the chambers.

19 Claims, 2 Drawing Sheets

AIR-BAG ASSEMBLY FOR A MOTOR VEHICLE

CROSS REFERENCE TO RELATED APPLICATIONS

This application claims priority to German application 10321066.0 filed May 10, 2003 and PCT/EP2004/004210 filed Apr. 21, 2004.

FIELD OF THE INVENTION

The present invention relates to automotive safety systems, and more specifically an airbag arrangement for use in a motor vehicle.

BACKGROUND OF THE INVENTION

Airbag arrangements have been state of the art within motor vehicle design and construction for a considerable time and, in addition to the safety belts which are already known, are a further component of the safety system intended to prevent vehicle occupants from coming into contact with the vehicle body structure or other vehicle components in the event of a collision.

Multi-chamber airbag systems in which different chambers of the airbag are assigned to certain body areas of the vehicle occupants, have proven worthwhile. The individual chambers can include different volumes and internal pressures if a crash should occur, to account for the different load-bearing capacity of the body areas of the occupants.

For example, an airbag is disclosed in DE 198 50 448 A1, which includes two airbags formed so as to be separate from one another and which are linked to a gas generator by means of a guide device for dividing the gas stream between the airbags. The guide device surrounds the circumference of the gas generator and includes outflow openings for filling the airbags. In order to be able to inflate the airbags independently of one another with a certain volume of gas, it is proposed that the guide device be provided with throttle elements for control of the gas flow. A particular disadvantage of this arrangement is the difficulty of the manufacturing process and its associated cost, resulting from the complexity of the guide device. In addition, this airbag arrangement is relatively large in size, requires a large amount of material and is therefore relatively heavy.

In addition, a side airbag is disclosed in U.S. Pat. No. 6,349,964 B1 in the form of an airbag unit which includes a multi-chamber system. The actual airbag of the airbag unit is divided into two inflatable chambers by means of a dividing seam, with a single gas generator allocated to both chambers together. This gas generator is accommodated in a housing with separate inflow openings for filling the chambers with the propellant gas created by the gas generator. The inflow openings are provided with means to change their own open cross-section, for example electrically activated sliders or covers, in order to provide different pressures in the chambers. Here again, the high degree of complexity of the unit must be mentioned, resulting in an increased tendency of faults or disturbances.

It is the goal of the present invention to avoid the disadvantages of the state of the art described above and to create an airbag arrangement for a motor vehicle including two or more chambers which is simpler to manufacture, reasonably priced and not liable to faults and disturbances, and whose chambers can exhibit different internal pressures if the airbag unit is activated.

SUMMARY OF THE INVENTION

In satisfying the above need, as well as overcoming the enumerated drawbacks and other limitations of the related art, the present invention proposes an airbag arrangement in which the airbag is divided into two or more chambers by means of a dividing seam. A gas generator is allocated to the airbag whose gas stream can be divided between the chambers if activated in order to unfold or inflate the chambers. In addition, the present invention configures the dividing seam of the airbag as a gas stream divider.

In a particularly advantageous embodiment of the invention, the dividing seam is provided with a seam reinforcement and an impact/guide surface for the gas stream in the area of the outflow openings of the gas generator. A connection area of the chambers to feed a certain proportion of the gas stream is formed between the gas generator, the outflow openings, and the seam.

Furthermore, it is possible to set a pressure difference between the chambers, at least at a certain actuation time, by means of different degrees of expansion, different volumes of the chambers, or by directing different proportions of the gas stream to the chambers within a certain period of time.

Finally, it is possible to set a pressure difference between the chambers. This is achieved by configuring the distance between the impact/guide surface of the seam reinforcement and the outflow openings of the gas generator in a particular way by properly forming the open cross-section of the connection area between the chambers, by means of the expansion of the impact/guide surface, by contouring the impact/guide surface, or by means of an angle of slope of the impact/guide surface to the flow normals of the outflow openings.

Also, at least the impact/guide surface of the seam reinforcement is formed so as to be pressure and heat-resistant, to avoid component failure.

The pressure and heat resistance of at least the impact/guide surface is preferably achieved by means of a thread forming the dividing seam made of, for example, aramide fibres, metal fibres or similar, or by means of coating the impact/guide surface with a pressure and heat-resistant material. The pressure and heat-resistant material can also be a hardened plastic or synthetic resin filled with, for example, aramide or metal fibres.

In an alternative embodiment of the invention the airbag arrangement is a side airbag arrangement. This is preferably located on or in a seat backrest, a side wall of the vehicle or a vehicle door. However, use of the airbag arrangement according to the invention, for example as a front airbag, is not excluded.

The proposed airbag arrangement is simple to manufacture, low-cost and very compact in form because a separate gas stream distributor is not included. In addition, the airbag arrangement is considered to be extremely reliable and also difference in pressure between the chambers in case of activation.

DETAILED DESCRIPTION OF THE INVENTION

Figure 1:
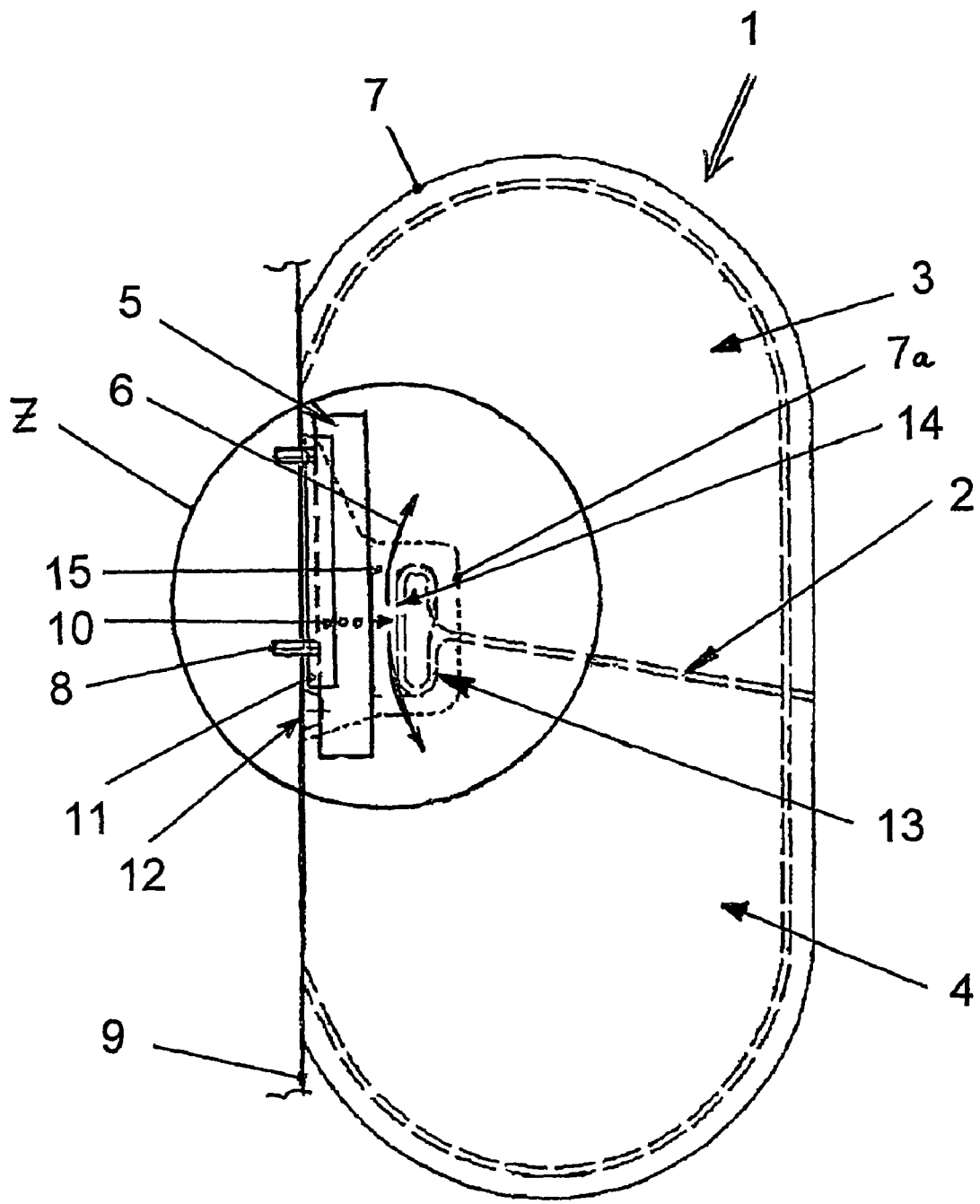
FIG. 1 is a top view of the airbag according to the present invention in an activated state and including an integrated gas generator.

FIG. 1 shows an airbag formed in accordance with the present invention in an activated or deployed state and designated at 1. The airbag 1 is divided into two chambers 3 and 4 by means of a dividing seam 2 which is sewn through the two outer layers of fabric forming airbag 1. Other embodiments of the present invention may also include more than one dividing seam 2 and more than two chambers 3 and 4. In the embodiment according to FIG. 1, the lower chamber 4 is arranged relative to the pelvic area of a motor vehicle occupant (not shown) and the upper chamber 3 is arranged relative to the thorax area of the occupant.

Furthermore, a gas generator 5 is arranged inside the airbag 1, and provides a propellant gas flow designated by arrows 6 for unfolding and inflation of the chambers 3 and 4. The gas generator 5 is fastened, for example to a module bracket 9 of the airbag 1, on or in the vehicle body (not shown), on or in a seat structure, for example the seat backrest (not shown), on or in a vehicle door (not shown), or to another suitable fixed point of the motor vehicle. Mechanical fastening elements 8, for example studs, bolts or screws, extend through an outer skin 7 of the airbag 1 in a gas tight manner.

In another example, the airbag 1 can be configured as a side airbag 1 whereby the chamber 3 is located at the top in accordance with FIG. 1 and is provided for protection of the breast and ribcage area and, if appropriate, the head of the vehicle occupant. Chamber 4 is provided to protect the pelvic area of the occupant.

In the present embodiment the gas generator 5 is primarily of cylindrical form and includes a plurality of outflow openings 10 to expel the propellant gas 6 distributed over its circumference.

In order to protect the outer fabric layer 7 of the airbag 1 or the fabric of the same against propellant gas 6 emerging at high speed, high pressure and high temperature, and to also guide the propellant gas 6 into the chambers 3 and 4, a U-shaped deflector 11 is located between the outer layer 7 and the gas generator 5. Furthermore, an additional separate fabric layer 7a can be provided for protection of the airbag material lying relatively close to the outflow openings 10.

Figure 2:
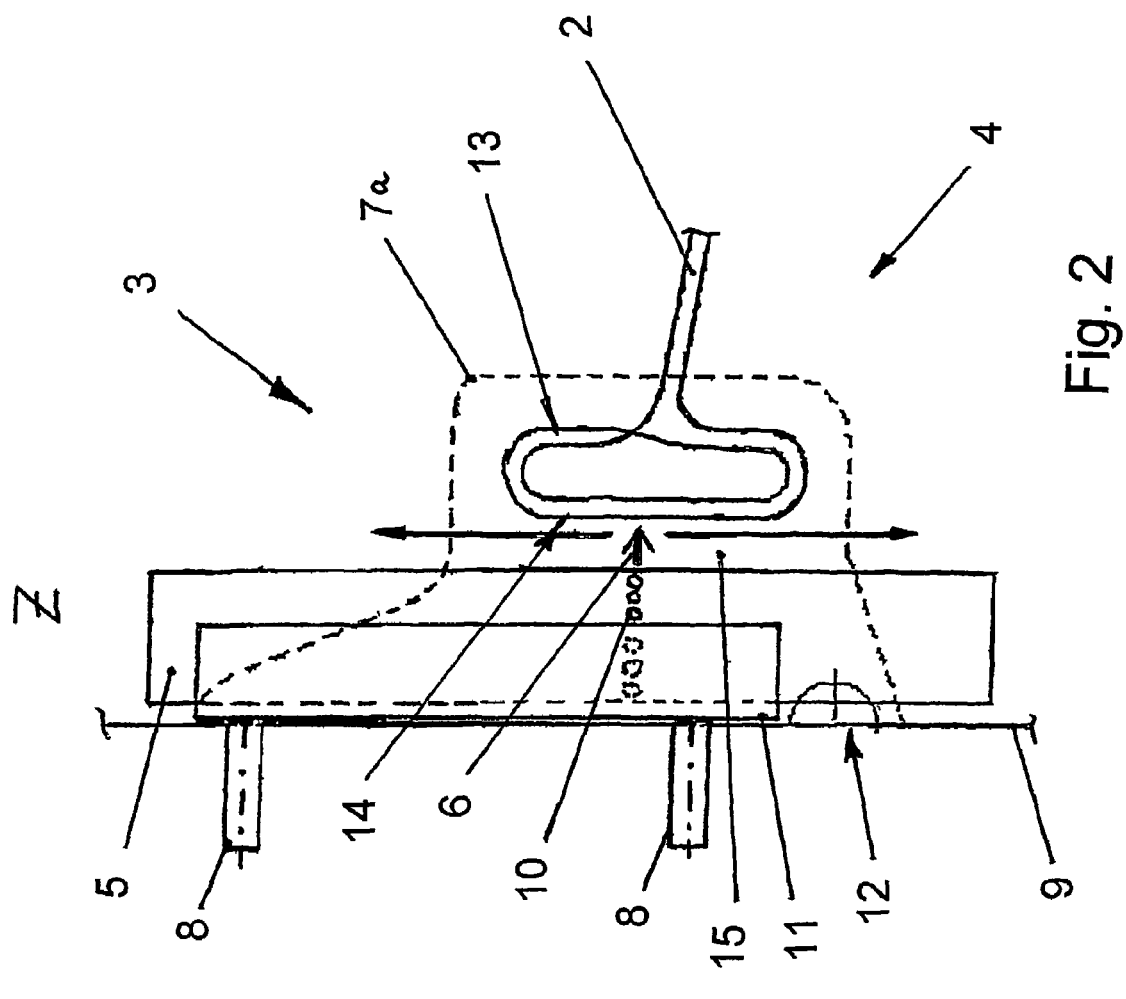
FIG. 2 is a detail view Z according to FIG. 1.

An insertion opening 12 is shown in FIG. 2 for assembly of the gas generator 5 into the airbag 1. The insertion opening 12 can be closed so as to be gas and pressure-tight.

As can be seen in FIG. 2, the dividing seam 2 is formed as a gas stream divider according to the present invention. This is accomplished by providing the dividing seam 2 with a seam reinforcement 13 including an impact/guide surface 14 facing the outflow openings 10 of the gas generator 5. Between the gas generator 5 and the seam reinforcement 13, a gas flow path 15 between the chambers 3 and 4 is formed to provide a certain proportion of the gas stream 6 to each of the chambers 3 and 4.

According to the present invention, the chambers 3 and 4 can be formed in such a way that they exhibit maximum expansions volumes which are different from one another. This allows a pressure difference to be set between the chambers 3 and 4 at a particular time during activation. This activation time is usually the time at which the vehicle occupant contacts the airbag, after, for example, a side impact was sensed and the airbag module was activated.

In the embodiment according to FIG. 1, the desired pressure in the lower chamber 4 is higher than the desired pressure in the upper chamber 3 because the pelvic area of an occupant can absorb greater forces than the thorax area. Other arrangements of the chambers can make other pressure relationships necessary.

Figure 3:
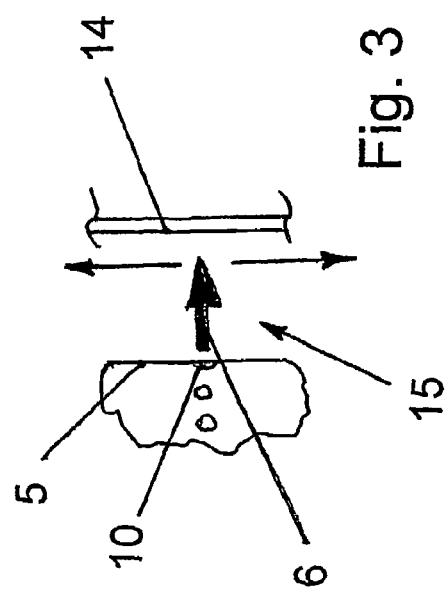
FIG. 3 is a first embodiment of an impact/guide surface of the airbag according to FIG. 1.

The present embodiment of the invention functions by directing the gas stream 6 vertically onto the impact/guide surface 14 of the seam reinforcement 13 (FIG. 3). This distributes the gas stream 6 almost equally between the two chambers 3 and 4. In this case the chamber 3 may have a lower volume and will be filled at a certain point in time $T_1$, while the other chamber 4 will not yet be completely inflated because of its larger volume, thereby creating the desired pressure differential between the chambers 3 and 4.

The gas flow path between the two chambers 3 and 4 means the pressures between the chambers 3 and 4 will balance at a certain point in time $T_2$. However, precisely at the point in time $T_1$, at which the body of the vehicle occupant strikes the airbag 1, particularly chambers 3 and 4, the desired pressure differential will be present.

According to a further embodiment of the invention, which can be used both alone and in combination with the embodiment described above, a desired pressure differential between the chambers 3 and 4 can also be implemented by feeding a different proportion of the gas stream 6 into each of the chambers 3 and 4.

This can be achieved, for example, by altering the distance between the impact/guide surface 14 of the seam reinforcement 13 and the outflow openings 10 of the gas generator 5. It may also be achieved by varying the shape of the open cross-section of the gas flow path 15 between the chambers 3 and 4. Finally, it is also possible to shape the impact/guide surface 14 in such a way to direct different proportions of the gas stream 6 into the chambers 3 and 4.

Figure 4:
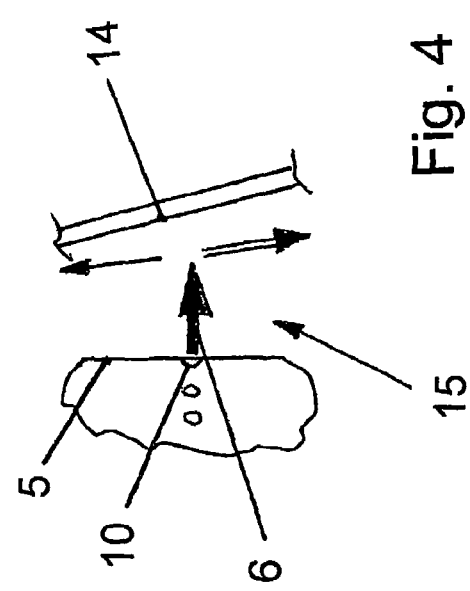
FIG. 4 is a second embodiment of the impact/guide surface according to FIG. 1.

An example of one of the above alternative embodiments is shown in FIG. 4 wherein the shape of the impact/guide surface 14 is configured at an angle to flow normals of the outflow openings 10. At least at a certain time during the airbag activation, this design, both alone and in combination with the aforementioned alternatives, means that it is possible to achieve a defined pressure differential between the chambers 3 and 4.

The scope of the present invention also includes the impact/guide surface 14 of the seam reinforcement 13 being formed so as to be resistant to pressure and heat. This is particularly useful, because gas the stream 6 strikes the impact/guide surface 14 at high speed, high pressure and high temperature before being deflected into the chambers 3 and 4.

To achieve these properties, the threads forming the dividing seam 13 are made of for example, aramide fibres such as Kevlar®, or of metal fibres or similar. However, it could also be imagined that at least the impact/guide surface 14 could be coated with a pressure and heat-resistant material, such as a suitable plastic or synthetic resin, which in some examples may also contain aramide or metal fibres. In addition, the dividing seam 13 could be soaked in such plastics or synthetic resins.

As a person skilled in the art will readily appreciate, the above description is meant as an illustration of implementation of the principles this invention. This description is not intended to limit the scope or application of this invention in that the invention is susceptible to modification, variation and change, without departing from spirit of this invention, as defined in the following claims.

The invention claimed is:

1. An airbag for use in motor vehicles comprising:
   outer fabric layers divided into two or more chambers by means of a dividing seam that joins the outer fabric layers together, and a gas generator configured to provide a gas stream when activated that can be divided between the two or more chambers in order to expand and inflate the chambers, the dividing seam is formed adjacent to the gas generator and has a seam reinforcement formed at an end of the dividing seam near at least one outflow opening of the gas generator, the seam reinforcement having an impact and guide surface arranged in the gas stream and facing towards the at least one outflow opening, the impact and guide surface is configured to be impacted by the gas stream and to guide the gas stream such that the gas stream is divided and directed between the two or more chambers.

2. An airbag according to claim 1, wherein the seam reinforcement is spaced apart from the gas generator and an area between the gas generator, seam reinforcement, and chambers is configured to form a gas flow path to feed a certain proportion of the gas stream into each of the two or more chambers.

3. An airbag according to claim 2, wherein the two or more chambers are configured having different maximum possible expansion volumes such that, at least at a particular activation time after activation of the gas generator, a pressure difference may be set between the two or more chambers.

4. An airbag according to claim 2, wherein different proportions of the gas stream are provided to the two or more chambers resulting in a pressure difference between the two or more chambers at least at a particular activation time.

5. An airbag according to claim 4, wherein a distance between the impact and guide surface of the seam reinforcement and the at least one outflow opening of the gas generator establishes the pressure difference between the chambers at least at a particular activation time.

6. An airbag according to claim 4, wherein the shape of a free cross-section of the gas flow path is configured to establish the pressure difference.

7. An airbag according to claim 4, wherein the at least one outlet opening defines a central axis formed therethrough and the impact and guide surface is configured at an oblique angle to the central axis so as to establish the pressure difference.

8. An airbag according to claim 2, wherein at least the impact and guide surface of the seam reinforcement is formed so as to be pressure and heat-resistant.

9. An airbag according to claim 8, wherein the pressure and heat resistance is achieved by means of a thread made of aramide fibres.

10. Airbag according to claim 8, wherein pressure and heat resistance is achieved by means of coating the impact and guide surface with a pressure and heat resistant material.

11. An airbag according to claim 10, wherein the pressure and heat resistant material is at least one of a plastic and synthetic resin.

12. An airbag according to claim 11, wherein the at least one of the plastic and synthetic resin includes one of aramide and metal fibres.

13. An airbag according to claim 8, wherein the pressure and heat resistance is achieved by means of a thread made of metal fibres.

14. An airbag according to claim 1, wherein the airbag is a side airbag.

15. An airbag according to claim 14, wherein the side airbag is located on or in a seat backrest, a side wall of a vehicle or a vehicle door.

16. An airbag according to claim 1, wherein the at least one outlet opening defines a central axis formed therethrough and the impact and guide surface is configured substantially perpendicular to the central axis.

17. An airbag according to claim 1, wherein the dividing seam is formed by a thread stitched through the outer fabric layers.

18. An airbag according to claim 17 further comprising a separate fabric layer disposed between the outer layers and about the gas generator, the separate fabric layer being for protection of the outer layers proximate the at least one outflow opening, wherein at least a portion of the thread is stitched through the separate fabric layer to form the impact and guide surface.

19. An airbag according to claim 18, wherein the portion of the thread forming the impact and guide surface is stitched in a linear configuration.

* * * * *